Figure 1:
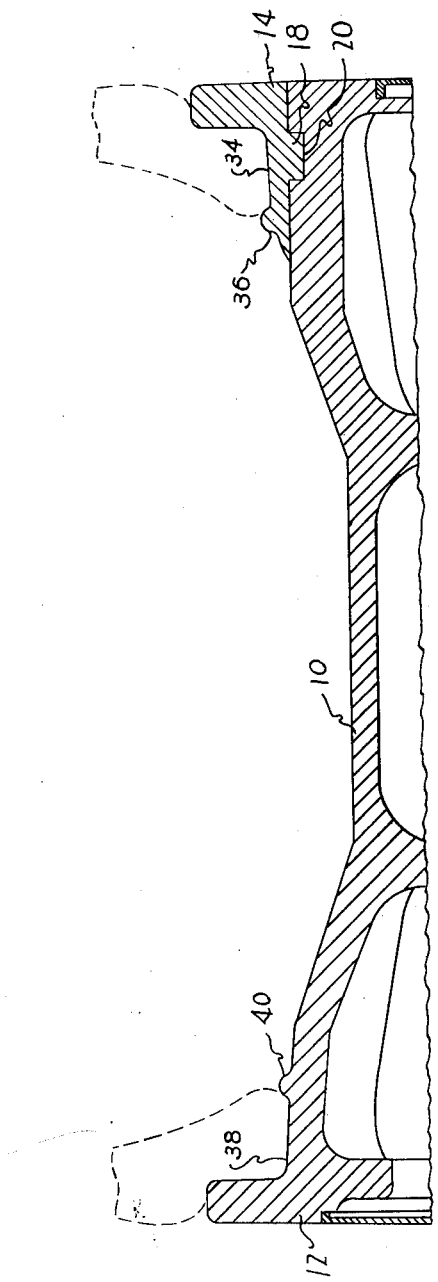

Aug. 29, 1944.   C. HOLLERITH   2,357,000
WHEEL CONSTRUCTION
Filed Jan. 6, 1941

Charles Hollerith  Inventor

By Beaman & Langford
Attorney

UNITED STATES PATENT OFFICE 2,357,000

WHEEL CONSTRUCTION

Charles Hollerith, Jackson, Mich., assignor to Hayes Industries, Inc., Jackson, Mich., a corporation of Michigan Application January 6, 1941, Serial No. 373,301

1 Claim. (Cl. 152—406)

This invention relates to wheel and rim constructions for pneumatic tires and has particular application to wheels and rims for aircraft.

It has heretofore been proposed to provide the wheel rim for pneumatic tires with annular ridge portions engaging with the inside of the tire beads to maintain the same adjacent the outer tire retaining flanges of the wheel rim. Reference may be had to the Sauer Patent No. 2,198,978, granted April 30, 1940, and disclosing this general type of construction and the purpose and advantages thereof.

In some wheel and tire constructions for aircraft purposes, the size and shapes of the tires are such that even in the case of so-called drop center rims, it is necessary to provide a split rim or tire retaining flange in order to mount and demount the tire. Where a split rim flange is used, it has been necessary to provide means for holding the segmental parts of the rim in position to prevent the split rim and tire from being rolled off the wheel upon deflation as when a blowout occurs.

According to the present invention, it is proposed to employ locking ridges upon the split rim flange which will function to retain the bead of the tire in position upon the split rim flange even in the event of deflation. With this arrangement the tire bead will function to retain the split rim flange in position when the tire is deflated as well as when it is inflated with the elimination of certain flange retaining structure now in use.

Thus, one of the objects of the present invention is to provide an aircraft wheel having a split rim flange with means for retaining the tire bead in position to cause the bead of the tire to remain in embracing position relative to the split rim flange in the event of deflation.

Another object is to provide a wheel having an integral tire retaining flange and a split removable tire retaining flange, the removable flange having spaced lateral portions for engaging opposite sides of the tire bead.

A further object is to provide a wheel and rim structure having a pair of tire retaining flanges, at least one of the flanges being removable and having means for engaging opposite sides of the tire bead.

A still further object of the invention is to provide a wheel or rim structure for pneumatic tires of the type disclosed having a removable tire retaining flange, there being provided means for preventing relative movement between the wheel body and the removable flange and means for preventing relative movement between the removable flange and the tire bead, supported thereon.

These and other objects and advantages residing in the present invention pertaining to the construction, combination and arrangement of parts disclosed in the accompanying drawing will be more fully described hereinafter in the detailed specification and annexed claim.

Figure 2:
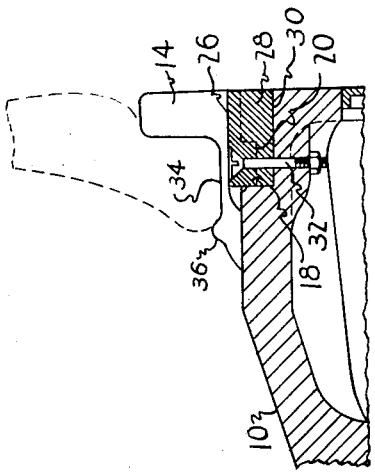
Figure 3:
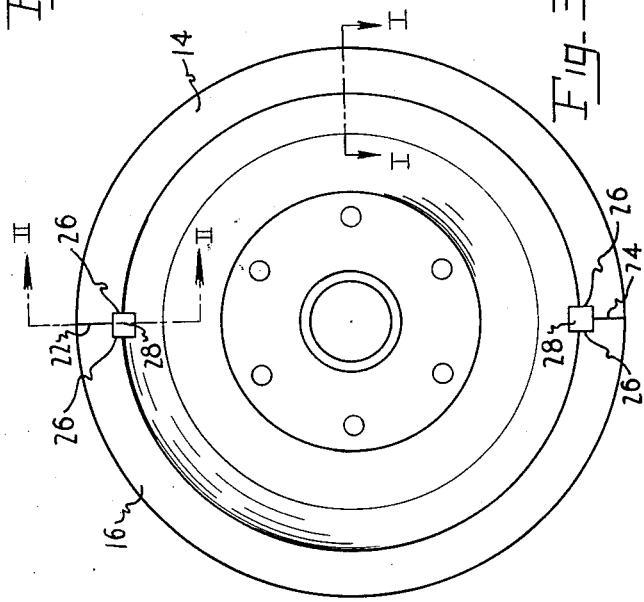

In the drawing, wherein a single embodiment of the present invention is disclosed, Fig. 1 is a cross-sectional view through a wheel having a split rim embodying the principles of the present invention, the pneumatic tire being shown in dotted outline, Fig. 2 is a fragmentary cross sectional view similar to Fig. 1 and taken on line II—II of Fig. 3, and Fig. 3 is an elevational view of the wheel structure showing the split rim flange and driving lugs.

In the illustrated embodiment of the invention, a cast aircraft wheel 10 is shown having an integral tire retaining flange 12 and a removable tire retaining flange comprising semi-circular portions 14 and 16. The flange sections 14 and 16 are generally L shaped in cross section and are shown provided with an annular rib 18 which interlocks with an annular groove 20 in the body of the wheel structure to prevent axial movement. The ends of the flange sections 14 and 16 are in opposed relation at 22 and 24 with the opposed ends grooved at 26 to provide abutting shoulders for the driving lugs 28 secured in grooves 30 by bolts 32.

The tire bead seat portions 34 of the flange sections 14 and 16 are provided with an annular ridge 36 while the bead seat 38 adjacent the flange 12 is provided with a similar ridge 40. The shape and construction of the ridges 36 and 40 will vary with different types of tires and wheels and perform the same general functions as that disclosed in the aforesaid Sauer patent.

It will be appreciated by those skilled in the wheel and rim art that even with the tire deflated as long as the bead of the tire is maintained upon the seat 34 of the flange sections 14 and 16, these sections will be retained against relative radial movement. In view of the fact that radial movement is required before the flange sections 14 and 16 may be moved axially because of the interlocking engagement between the elements 18 and 20, the ridges 36 and 40 in the combination disclosed function to maintain the flange sections 14 and 16 in their proper position even in the event of deflation of the tire with the elimination of all extraneous means for holding these split rim or flange sections in position as has heretofore been the practice.

Having thus described my invention, what I desire to secure by Letters Patent and claim is:

A wheel for a pneumatic tire comprising a wheel body having a peripheral tire receiving portion provided with an integral outwardly projecting tire retaining flange at one side and being of reduced diameter toward the other side, the portion of reduced diameter having a peripheral groove therein, a pair of semi-circular removable tire retaining flange members fitted on the portion of reduced diameter and having a rib received in the peripheral groove, said removable tire retaining flange members being generally L-shaped in cross section with one arm of the L-shape conforming around and extending inwardly along the wheel body and externally provided with a peripheral tire bead seat and the other arm projecting outwardly as a tire retaining flange, and said removable members being provided with a low annular ridge spaced inwardly from the outwardly projecting flange beyond the tire bead seat.

CHARLES HOLLERITH.